A. BRUNNERT.
EGG CANDLER SCOOP.
APPLICATION FILED FEB. 5, 1912.
1,030,280.
Patented June 25, 1912.
2 SHEETS—SHEET 1.
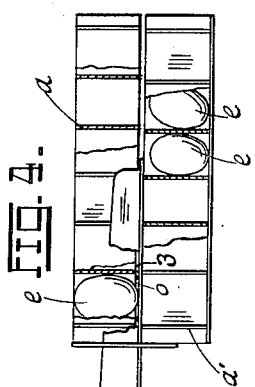
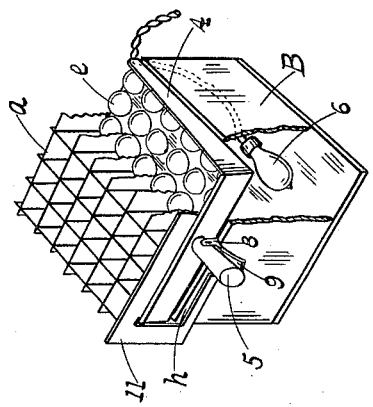
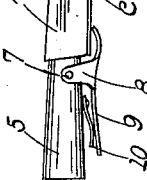
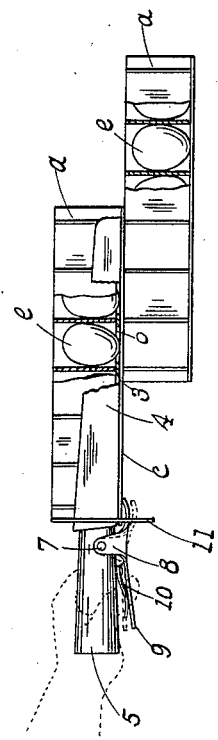
WITNESSES:
Harry A. Beimel
Jos. A. Michel
INVENTOR.
Anton Brunnert·
BY
ATTORNEY.
COLUMBIA PLANOGRAPH CO., WASHINGTON, D. C.

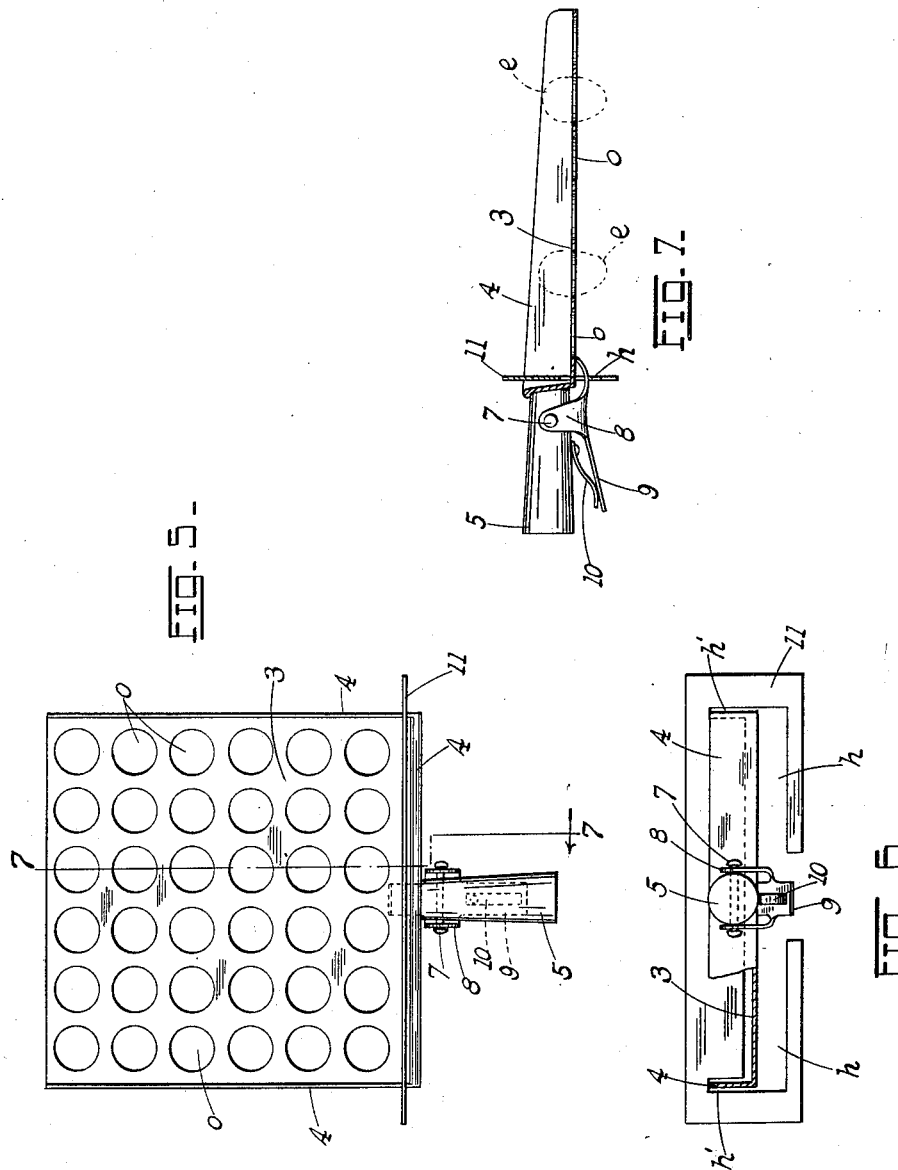

UNITED STATES PATENT OFFICE.

ANTON BRUNNERT, OF OLD MONROE, MISSOURI, ASSIGNOR OF ONE-HALF TO HENRY F. FREISE, OF OLD MONROE, MISSOURI.

EGG-CANDLER SCOOP.

1,030,280.  Specification of Letters Patent.  Patented June 25, 1912.

Application filed February 5, 1912. Serial No. 675,478.

*To all whom it may concern:*

Be it known that I, ANTON BRUNNERT, a citizen of the United States, residing at Old Monroe, in the county of Lincoln and State of Missouri, have invented certain new and useful Improvements in Egg-Candler Scoops, of which the following is a full, clear, and exact description, reference being had to the accompanying drawings, forming a part hereof.

My invention has relation to improvements in egg-candler scoops; and it consists in the novel construction of scoop more fully set forth in the specification and pointed out in the claims.

In the drawings, Figure 1 is a perspective of an egg-case showing my invention applied thereto; Fig. 2 is a perspective of a candler-box with my invention applied; Fig. 3 is a side view of the scoop applied to a filler of eggs preparatory to the transfer of the eggs from one filler to another; Fig. 4 is a similar view showing the method of transferring the eggs from one filler to another; Fig. 5 is a top plan of the scoop; Fig. 6 is a rear end view, parts being broken; and Fig. 7 is a longitudinal section on the line 7—7 of Fig. 5.

The object of my invention is to provide a scoop for handling a filler of eggs for purposes of transferring such filler from one case to another, the said scoop likewise serving the purpose of candling the eggs, all as will more fully appear from a detailed description of the invention which is as follows:—

Referring to the drawings, 1 represents a shipping case provided with a door 2 hinged at the bottom of the case, said door when dropped allowing free access to the contents of the case (Fig. 1). This contents is composed of a series of superposed egg-fillers *a* filled with eggs *e*, the successive fillers being separated by removable partition sheets of cardboard *c* as well understood in the art.

The scoop in the present instance is composed of a body portion or plate 3 bounded on the sides and rear by an upturned flange 4, the sides of the flange tapering toward the outer edge of the scoop. To the rear portion of the flange is secured the handle 5. In the particulars mentioned, the scoop is of the ordinary construction and of conventional form. The bottom or body 3 is provided with series of openings *o* for receiving and holding the eggs to be candled, the candling being effected preferably by placing a scoop-full of eggs over the open top of a candler-box B, the interior of which is lighted by an electric bulb 6 or any equivalent light (Fig. 2). Pivotally secured to the sides of the handle 5 by means of a hinge-pin 7 passed through ears 8, is a clasp member or lever 9, against the inner face of whose long arm bears the free end of a flexed spring 10, the fixed end of which is secured to the bottom of the handle (Fig. 7). Adapted to rest on and slide along the sides of the flange 4 is a discharge plate 11, the said plate being in the form of a plate having an elongated opening or slot *h* through which the scoop is freely admitted (Fig. 6), the upper corners of the slot terminating in vertical recesses or grooves *h'* for receiving the sides of the flange 4, the rear member of the flange arresting the plate against a rearward movement, and thus preventing the plate from sliding off the scoop on the side toward the handle.

The operation may be described as follows:—Assuming that a case of eggs packed in fillers is to be candled, the operator takes the scoop and passes the same under the top filler and over the cardboard partition *c* (Fig. 1). The scoop is so proportioned as to cause the side flange members thereof to engage the sides of the filler. The operator then picks up the filler of eggs, the latter settling into the openings *o* as the scoop is lifted. It is to be noted that the openings *o* are distributed to correspond to the compartments of the filler *a*. The eggs being thus lifted on the scoop, the latter is transferred to the box B where the eggs (in their filler *a*) are candled. The operator then deposits the candled eggs into another case similar to the case 1. The illustration in Fig. 1 may serve to either show the manner in which a filler of eggs is removed from a case for purposes of candling, or it may serve to show how a candled scoop-full of eggs is transferred to a case. If we suppose momentarily that Fig. 1 illustrates the latter act, we can assume that the scoop 3 with its eggs and filler has been placed over a partition *c* (resting on top of a previous filler) and is in the act of being withdrawn. The plate 11 which, when hanging from the scoop, projects partly above and partly below the scoop, will simultaneously engage not only the filler on the scoop, but the filler immediately beneath. The operator therefore, by holding the plate with one hand against the two superposed fillers, with the other hand pulls out the scoop, leaving the upper filler deposited on the partition c separating the fillers. During the withdrawal of the scoop, the plate serves to hold the fillers stationary or against any possible displacement as quite obvious from the drawings. Of course, to merely scoop up a filler of eggs, the plate is shoved back against the rear flange member as shown in Fig. 2.

The clasp 9 is brought into requisition under the following conditions: It often happens that a farmer desires a return of his particular fillers, in which event the eggs must be transferred from the farmer's filler a, to another filler a' (Figs. 3, 4). In that event the operator passes the scoop under the topmost of the series of farmer's fillers, passing the scoop over the partition sheet c. At the same time the operator presses on the rear long arm of the clasp-lever 9 so as to allow the rear arm to open, after which by releasing the clasp, the spring 10 will close the rear arm of the clasp, causing it to grip the sheet c between it and the bottom of the scoop (the rear clasp-arm reaching to a point opposite the scoop-bottom). The sheet c thus becomes clamped to the scoop, and may be pulled out together with the filler of eggs on the scoop (Fig. 3). By now transferring the scoop full of eggs with the sheet c attached, and placing the whole over a filler a' (Fig. 4), the operator withdraws the scoop, together with the sheet c from between the fillers a, a', the eggs in the filler a thus left unsupported dropping into the compartments of the filler a', whereupon the filler a may be returned to the farmer. This transfer of the eggs from the fillers a to the fillers a', may be done after the contents of the filler a have been candled in the manner already described. The plate 11 obviously must be used in either operation, since it holds the superposed fillers against displacement during the withdrawal of the scoop.

Details shown but not alluded to are old in the art, and require no description in the present connection.

Having described my invention, what I claim is:—

1. A scoop having a bottom provided with openings for receiving and supporting eggs, a flange bounding the sides and rear edge of said bottom, a handle projecting from the rear member of the flange, a spring-controlled clasp hinged to the handle and adapted to be manipulated by the finger of the operator, the clasp being provided with a member adapted to grip an egg-filler partition sheet between said member and the bottom of the scoop, for the purpose set forth.

2. In combination with a scoop adapted to pick up a filler of eggs, and provided with side and rear marginal up-turned flanges, the bottom of the scoop being provided with openings for the support of eggs to be candled, a discharge plate composed of a member having an opening through which the scoop may be inserted, the upper ends of the opening terminating in vertical recesses for the reception of the side flanges of the scoop, the plate projecting above and below the egg-supporting surface of the scoop for simultaneously engaging two superposed fillers of eggs.

3. In combination with a scoop adapted to pick up a filler of eggs, and provided with side and rear marginal up-turned flanges, a handle on the rear flange, a spring-controlled hand-manipulated clasp having one end operating opposite the bottom of the scoop, said bottom being provided with openings for the support of eggs to be candled, a discharge plate having an opening for the free insertion of the scoop, the upper corners of the opening being provided with recesses for the reception of the side flanges of the scoop, the plate projecting above and below the scoop to simultaneously engage two superposed egg-fillers.

In testimony whereof I affix my signature, in presence of two witnesses.

ANTON BRUNNERT.

Witnesses:
 EMIL STAREK,
 JOS. A. MICHEL.

---

Copies of this patent may be obtained for five cents each, by addressing the "Commissioner of Patents, Washington, D. C."